US007296288B1

(12) United States Patent
Hill et al.

(10) Patent No.: US 7,296,288 B1
(45) Date of Patent: Nov. 13, 2007

(54) METHODS, APPARATUSES, AND SYSTEMS ALLOWING FOR BANDWIDTH MANAGEMENT SCHEMES RESPONSIVE TO UTILIZATION CHARACTERISTICS ASSOCIATED WITH INDIVIDUAL USERS

(75) Inventors: Mark Hill, Los Gatos, CA (US); Guy Riddle, Los Gatos, CA (US); Robert E. Purvy, San Jose, CA (US)

(73) Assignee: Packeteer, Inc., Cupertino, CA (US)

( * ) Notice: Subject to any disclaimer, the term of this patent is extended or adjusted under 35 U.S.C. 154(b) by 788 days.

(21) Appl. No.: 10/295,391

(22) Filed: Nov. 15, 2002

(51) Int. Cl.
*G06F 21/00* (2006.01)
(52) U.S. Cl. .......................................... 726/2; 713/194
(58) Field of Classification Search ............... 713/1, 713/2, 188, 194, 193; 380/200, 201, 255, 380/277; 726/2, 3, 11–15
See application file for complete search history.

(56) References Cited

U.S. PATENT DOCUMENTS

| | | | | |
|---|---|---|---|---|
| 6,339,784 B1* | 1/2002 | Morris et al. | ................ | 709/204 |
| 6,484,203 B1* | 11/2002 | Porras et al. | ................ | 709/224 |
| 6,691,165 B1* | 2/2004 | Bruck et al. | ................ | 709/227 |
| 6,934,745 B2* | 8/2005 | Krautkremer | ................ | 709/223 |
| 2003/0018889 A1* | 1/2003 | Burnett et al. | ................ | 713/153 |
| 2003/0235209 A1* | 12/2003 | Garg et al. | ................ | 370/468 |

* cited by examiner

*Primary Examiner*—Kim Vu
*Assistant Examiner*—Joseph Pan
(74) *Attorney, Agent, or Firm*—Mark J. Spolyar

(57) ABSTRACT

Methods, apparatuses and systems allowing for bandwidth management schemes responsive to utilization characteristics associated with individual users. In one embodiment, the present invention allows network administrators to penalize users who carry out specific questionable or suspicious activities, such as the use of proxy tunnels to disguise the true nature of the data flows in order to evade classification and control by bandwidth management devices. In one embodiment, each individual user may be accorded an initial suspicion score. Each time the user is associated with a questionable or suspicious activity (for example, detecting the set up of a connection to an outside HTTP tunnel, or peer-to-peer application flow), his or her suspicion score is downgraded. Data flows corresponding to users with sufficiently low suspicion scores, in one embodiment, can be treated in a different manner from data flows associated with other users. For example, different or more rigorous classification rules and policies can be applied to the data flows associated with suspicious users.

34 Claims, 7 Drawing Sheets

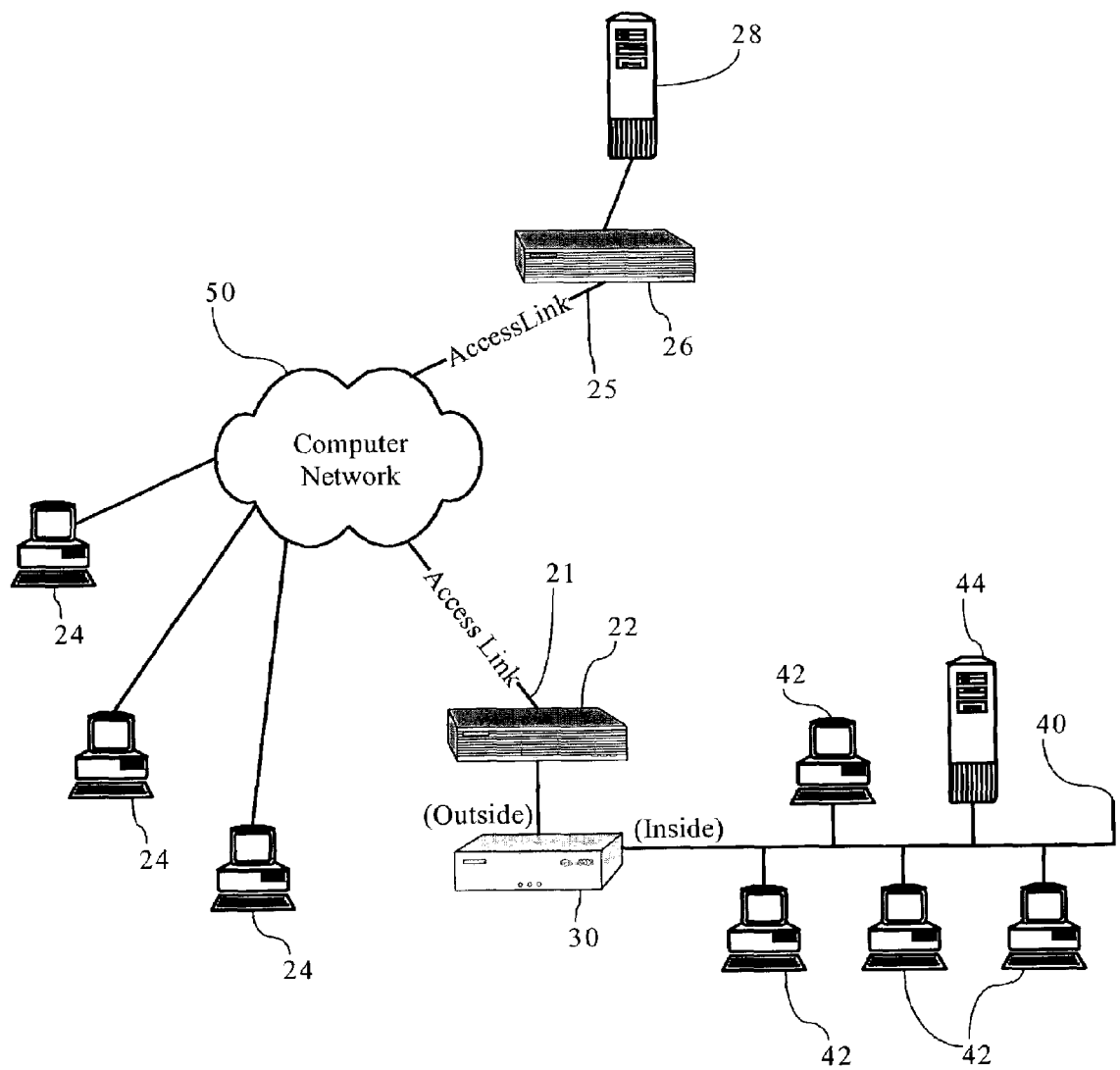
Fig._1

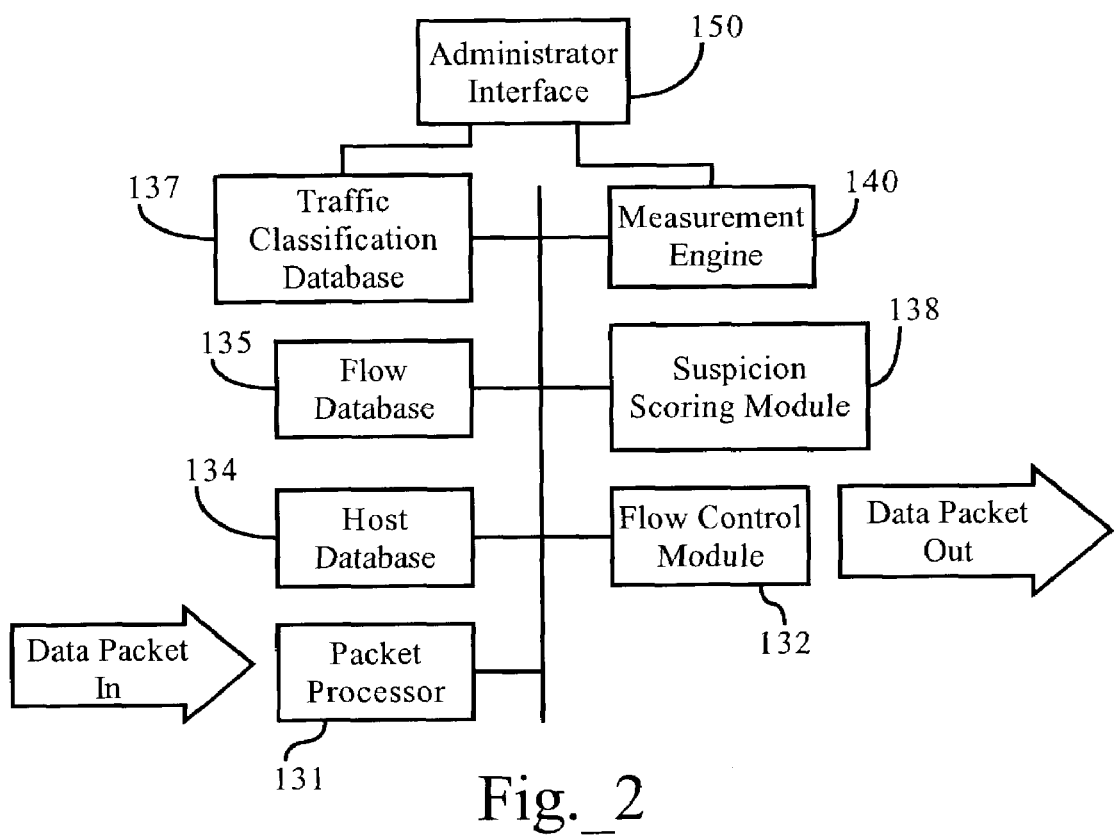
Fig._2

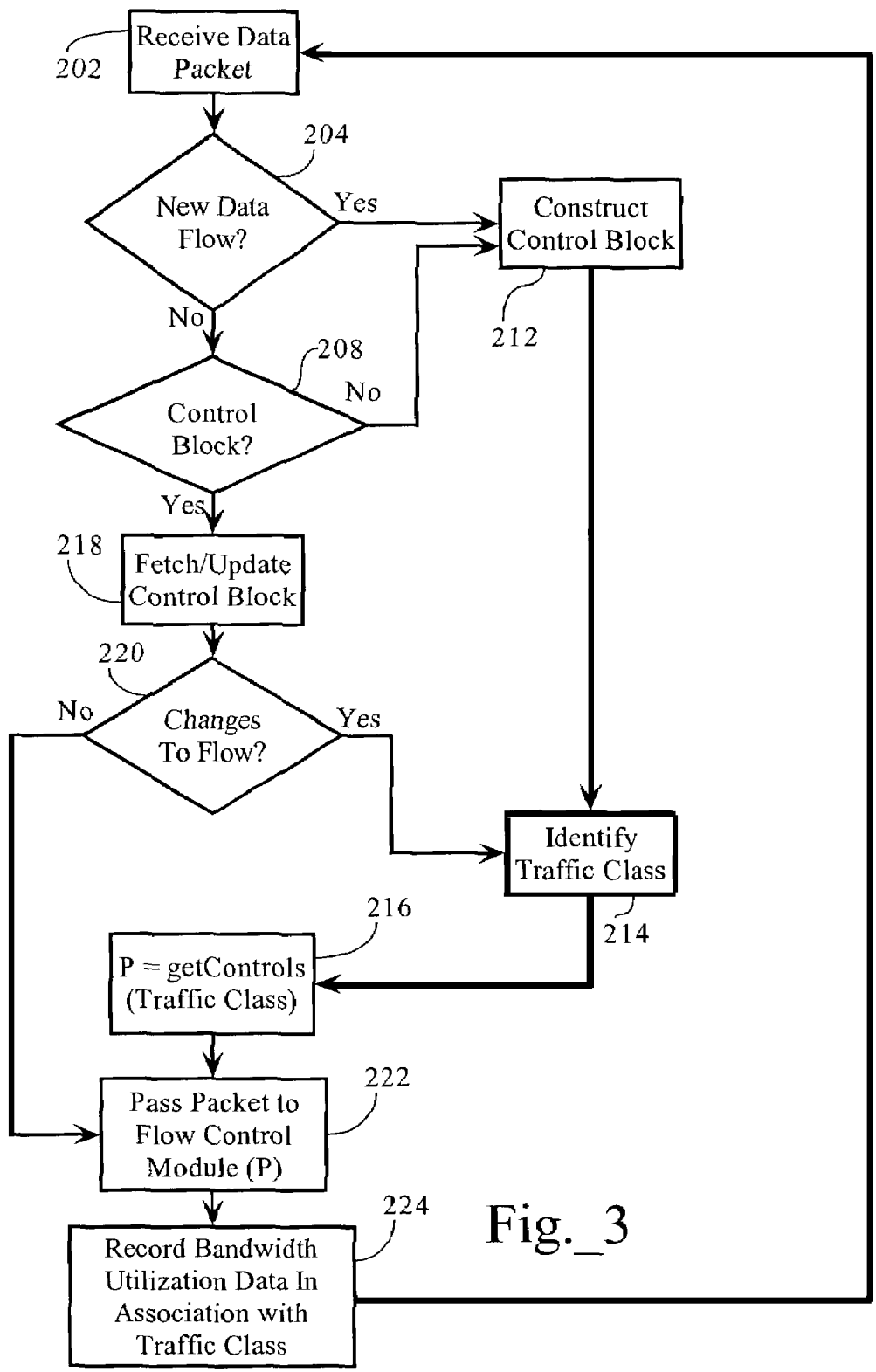
Fig._3

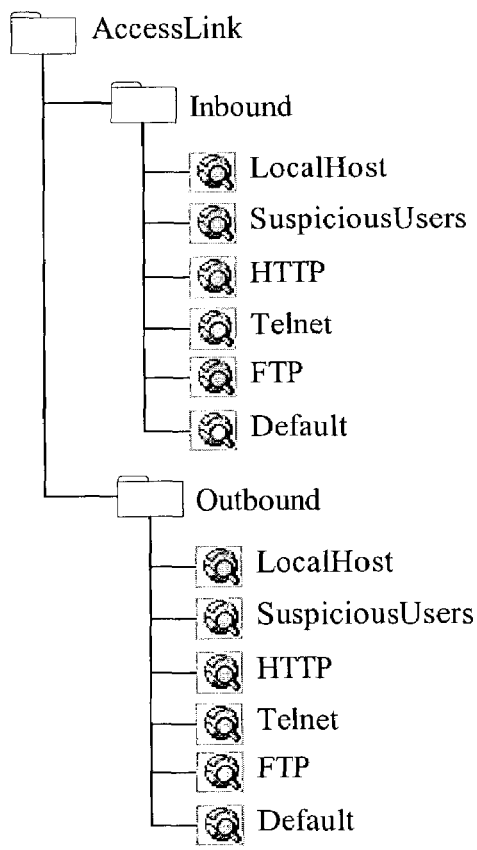
Fig._4A
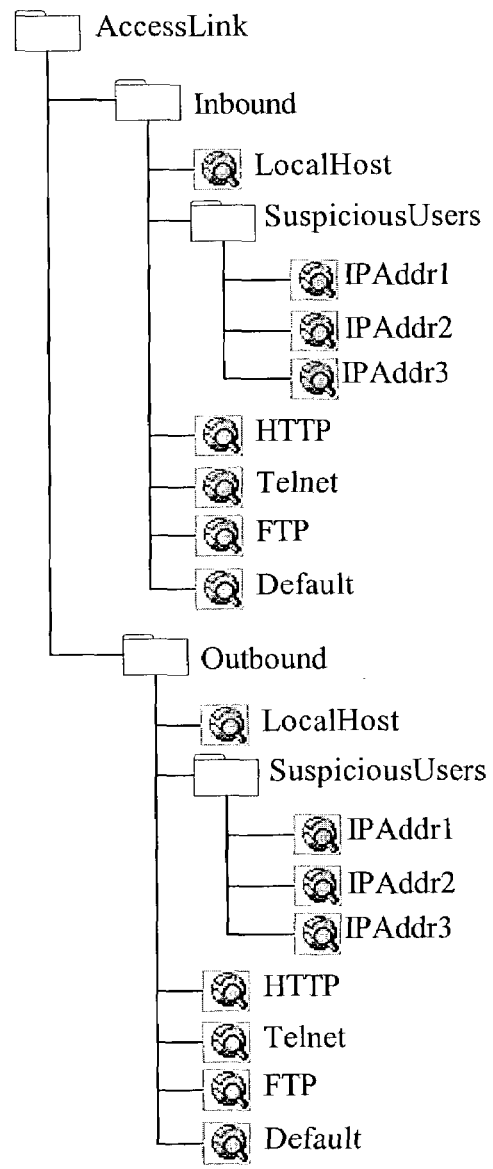
Fig._4B

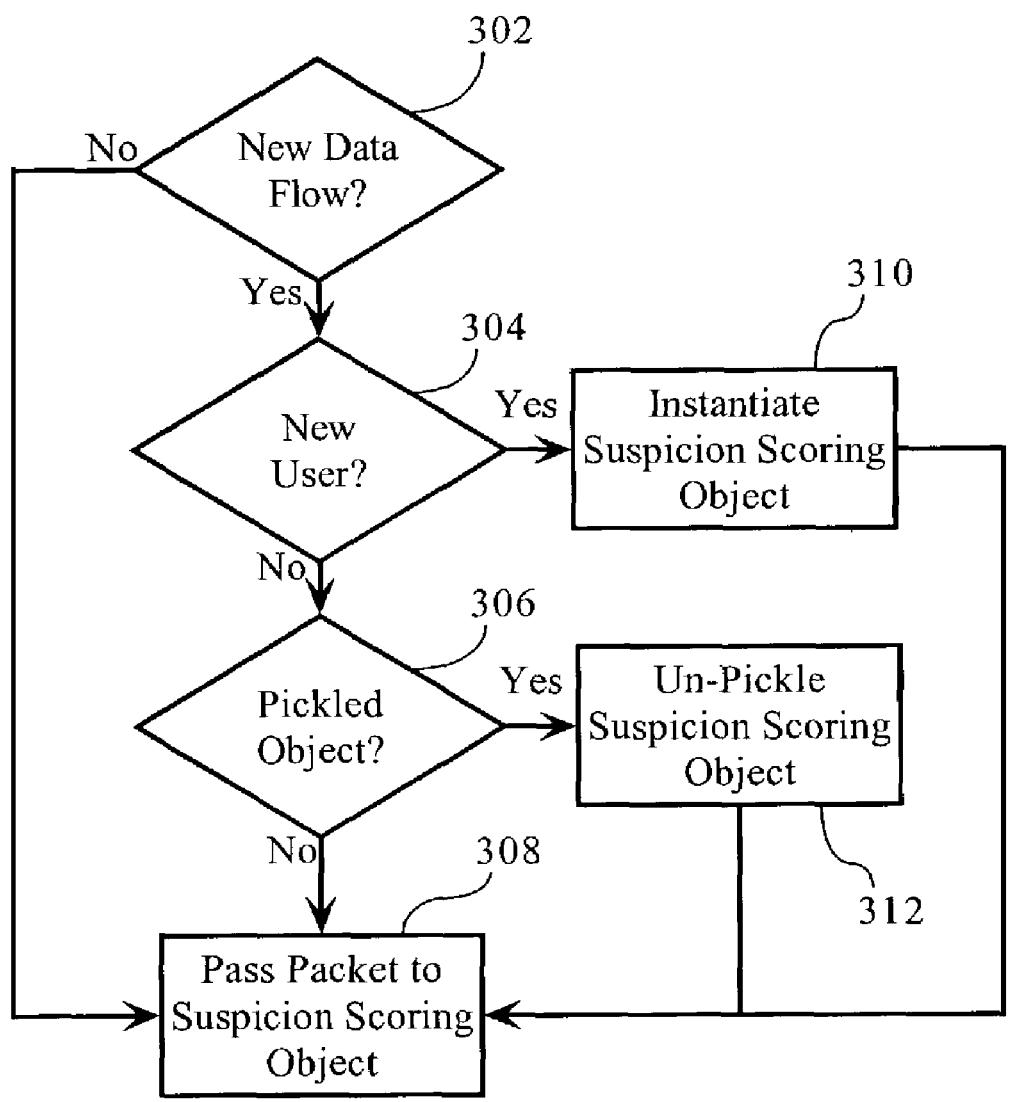
Fig._5

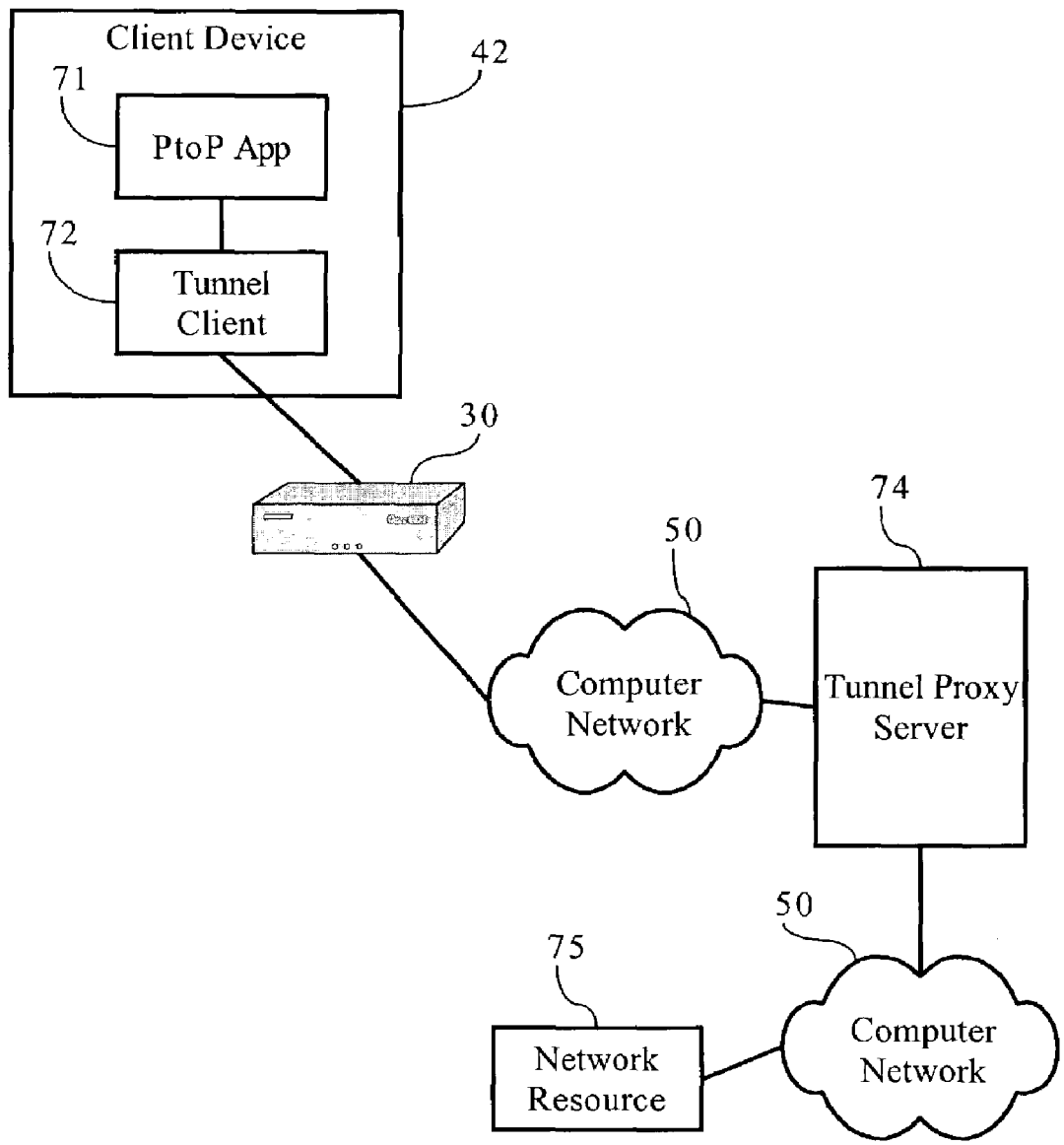
Fig._6

| IP Address | Conn | RTT to PS | Curr Rate | 1 Min Avg | Peak Rate | *New Flows Per Minute* | | |
|---|---|---|---|---|---|---|---|---|
| | | | | | | Client | Server | Failed |
| 216.203.49.219 | 0 | 80ms | 2730 | 420 | 2730 | 0 | 90 | 0 |
| 216.148.237.158 | 1 | 14ms | 235k | 19.1k | 235k | 0 | 84 | 0 |
| 216.148.237.145 | 5 | 48ms | 2303 | 4871 | 49k | 0 | 64 | 0 |
| 10.7.15.8 | 11 | 3ms | 310k | 58.9k | 310k | 42 | 0 | 0 |
| 10.255.255.255 | 2 | *** | 3397 | 3464 | 17.6k | 0 | 28 | 0 |
| 10.7.15.4 | 0 | *** | 654 | 190 | 1112 | 11 | 6 | 0 |
| 10.1.1.40 | 0 | *** | 643 | 188 | 1112 | 6 | 11 | 0 |
| 207.46.249.61 | 0 | 25ms | 15.2k | 20.5k | 220k | 0 | 14 | 0 |
| 10.1.1.16 | 1 | *** | 3657 | 2905 | 17.7k | 0 | 11 | 0 |
| 255.255.255.255 | 1 | *** | 1735 | 430 | 5357 | 0 | 4 | 0 |
| 10.7.11.2 | 0 | *** | 0 | 0 | 11.1k | 3 | 0 | 0 |
| 10.7.15.13 | 2 | *** | 549 | 252 | 11.3k | 0 | 3 | 0 |
| 66.218.71.83 | 2 | 124ms | 492 | 4217 | 90.6k | 0 | 2 | 0 |
| 10.2.1.10 | 0 | *** | 0 | 0 | 343 | 1 | 0 | 0 |
| 239.255.255.253 | 2 | *** | 39 | 25 | 1305 | 0 | 1 | 0 |
| 10.7.15.5 | 0 | *** | 485 | 318 | 8787 | 1 | 0 | 0 |
| 10.1.1.18 | 1 | *** | 1349 | 771 | 2091 | 1 | 0 | 0 |
| 10.10.254.74 | 0 | *** | 0 | 54 | 345 | 1 | 0 | 0 |
| 10.10.253.70 | 0 | *** | 0 | 0 | 37 | 0 | 0 | 0 |
| 10.7.31.22 | 0 | *** | 0 | 0 | 2 | 0 | 0 | 0 |

Table 7

METHODS, APPARATUSES, AND SYSTEMS ALLOWING FOR BANDWIDTH MANAGEMENT SCHEMES RESPONSIVE TO UTILIZATION CHARACTERISTICS ASSOCIATED WITH INDIVIDUAL USERS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/885,750, in the name of Scott Hankins and Brett Galloway, entitled "System and Method For Dynamically Controlling a Rogue Application Through Incremental Bandwidth Restrictions;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/015,826, in the name of Guy Riddle, entitled "Dynamic Tunnel Probing in a Communications Network;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;"

U.S. patent application Ser. No. 10/177,518, in the name of Guy Riddle, entitled "Methods, Apparatuses and Systems Allowing for Progressive Network Resource Utilization Control Scheme;" and U.S. patent application Ser. No. 10/178,617, in the name of Robert E. Purvy, entitled "Methods, Apparatuses and Systems Facilitating Analysis of Network Device Performance."

FIELD OF THE INVENTION

The present invention relates to computer networks and bandwidth management, and, more particularly, to methods, apparatuses and systems allowing for bandwidth management schemes responsive to the utilization characteristics associated with individual users.

BACKGROUND OF THE INVENTION

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions.

While the systems and methods discussed above that allow for traffic classification and application of bandwidth utilization controls on a per-traffic-classification basis operate effectively for their intended purposes, they possess certain limitations. As discussed more fully below, identification of traffic types associated with data flows traversing an access link involves the application of matching criteria or rules to various characteristics of the data flows. Such matching criteria can include source and destination IP addresses, port numbers, MIME types, etc. After identification of a traffic type corresponding to a data flow, a bandwidth management device associates and subsequently applies bandwidth utilization controls (e.g., a policy or partition) to the data flow corresponding to the identified traffic classification or type. A common use of bandwidth management devices is to limit the bandwidth being consumed by unruly, bandwidth-intensive applications, such as peer-to-peer applications (e.g., Kazaa, Napster, etc.). Network savvy users (such as students in a campus or university environment), however, have become aware that such bandwidth management devices have been deployed to limit or restrict such unauthorized network traffic. As a result, users often attempt to bypass or thwart the bandwidth management scheme effected by such bandwidth management devices by creating communications tunnels (proxy tunnels) through which unauthorized or restricted network traffic is sent. The attributes discernible from the content of these tunneled data flows, however, often reveal little information about its true nature. For example, commercial HTTP tunnel services (such as loopholesoftware.com, TotalRc.net, and http-tunnel.com, etc.) allow users to send all network traffic in the form of HTTP traffic through a HTTP tunnel between a tunnel client and an HTTP proxy server maintained by the tunnel services provider. FIG. 6 illustrates the functionality and operation of a typical HTTP proxy tunnel. Client device 42 includes a client application (such as a peer-to-peer application 71) and a tunnel client 72. The client application sends data to the tunnel client 72 which tunnels the data over HTTP to a tunnel proxy server 74. The tunnel proxy server 74 then forwards the data to the intended destination (here, network resource 75), and vice versa. Such HTTP tunnels typically feature encryption; accordingly, a bandwidth management device 30, encountering the tunneled traffic in this form, may not detect the exact nature of the traffic and, in fact, classify such data flows as legitimate or regular HTTP traffic. Accordingly, these tunneling mechanisms and other techniques for evading bandwidth utilization controls implemented by bandwidth management devices present new challenges to network administrators and bandwidth device manufacturers desiring to effectively control unauthorized or restricted network traffic.

In light of the foregoing, a need in the art exists for methods, apparatuses and systems allowing for bandwidth management schemes that are responsive to the utilization characteristics associated with individual users. A need in the art further exists for methods, apparatuses and systems allowing for detection of questionable or other activities designed to evade bandwidth management control schemes and, thus, enabling application of more rigorous network traffic classification mechanisms and/or disparate bandwidth utilization controls. Embodiments of the present invention substantially fulfill these needs.

SUMMARY OF THE INVENTION

The present invention provides methods, apparatuses and systems allowing for bandwidth management schemes responsive to utilization characteristics associated with individual users. In one embodiment, the present invention allows network administrators to penalize users who carry out specific questionable or suspicious activities, such as the use of proxy tunnels to disguise the true nature of the data flows in order to evade classification and control by bandwidth management devices. In one embodiment, each individual user may be accorded an initial suspicion level. Each time the user is associated with a questionable or suspicious activity (for example, detecting the setup of a connection to an outside HTTP tunnel, or peer-to-peer application flow), his or her suspicion level is adjusted. Data flows corresponding to users with sufficiently high suspicion levels, in one embodiment, can be treated in a different manner from data flows associated with other users. For example, different or more rigorous classification rules and bandwidth management policies can be applied to the data flows associated with suspicious users. For example, data flows associated with suspicious users may be examined more closely in order to determine more thoroughly or accurately appropriate classification rules and/or bandwidth management policies.

DESCRIPTION OF THE DRAWINGS

FIG. 1 is a functional block diagram illustrating a computer network environment including a bandwidth management device according to an embodiment of the present invention.

FIG. 2 is a functional block diagram setting forth the functionality in a bandwidth management device according to an embodiment of the present invention.

FIG. 3 is a flow chart providing a method directed to processing data packets to allow for enforcement of bandwidth utilization and other controls on network data flows.

FIG. 4A is a diagram illustrating a traffic classification configuration for a given access link according to an embodiment of the present invention.

FIG. 4B is a diagram illustrating a traffic classification configuration for a given access link according to another embodiment of the present invention.

FIG. 5 is a flow chart diagram setting forth a method directed to the management of suspicion scoring objects according to an embodiment of the present invention.

FIG. 6 is a functional block diagram illustrating a proxy tunnel which may be used in attempts to circumvent the bandwidth utilization controls implemented by bandwidth management devices.

Table 7 sets forth the data flow metrics, according to an embodiment of the present invention, maintained for each host associated with data flows traversing a bandwidth management device.

DESCRIPTION OF PREFERRED EMBODIMENT(S)

I. Exemplary Operating Environment

FIG. 1 sets forth a packet-based computer network environment including a bandwidth management device 30. As FIG. 1 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 30 is provided between router 22 and local area computer network 40. Bandwidth management device 30 is operative to classify data flows and, depending on the classification, enforce respective bandwidth utilization controls on the data flows to control bandwidth utilization and optimize network application performance across access link 21.

A. Bandwidth Management Device

FIG. 2 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, suspicion scoring module 138, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Suspicion scoring module 138 is operative to examine data flows associated with individual users and evaluate whether characteristics of the data flows indicate suspicious activity (e.g., an attempt to evade classification and, therefore, configured bandwidth management controls, and/or indications that such attempts may be likely). Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls, such as a partition, as well as other controls. Administrator interface 150 also displays various views associated with a hierarchical traffic classification scheme and allows administrators to configure or revise the hierarchical traffic classification scheme as discussed more fully below. Administrator interface 150 can be a command line interface or a graphical user interface accessible, for example, through a conventional browser on client device 42.

A.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, a control block object contains a flow specification object (or a pointer thereto) including such attributes as pointers to the "inside" and "outside" IP addresses in host database 134, as well as other flow specification parameters, such as inside and outside port numbers, service type, protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, number of packets, aggregate bytes, etc. Control block object attributes further include at least one traffic class identifier (or pointer(s) thereto) associated with the data flow, as welt as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

As discussed above, host database 134 stores the IP or other computer network addresses associated with the end systems identified in data flows traversing bandwidth management device. In one embodiment, host database 134 maintains for each IP address, an "inside/outside" flag value set to indicate whether the IP address corresponds to an "inside" or "outside" system (see above), and a suspicion level, score or other value computed by suspicion scoring module 138, as described more fully below. In other embodiments, host database 134 can also be extended to maintain other suspicion score values, such as an average suspicion score over an interval, the lowest/highest suspicion score over an interval, etc. In one embodiment, host database 134 is maintained in a host object space, which (in one embodiment) is a computer-readable medium (e.g., Flash memory), or an allocated portion thereof, allowing for storage, access to and modification of host objects including the attributes defining the hosts. In one embodiment, the host object space is finite allowing for the storage of only a limited number of host objects at any one time. In one embodiment, bandwidth management device 30 maintains a Least-Recently Used (LRU) list of host objects corresponding to inactive data flows based on the last packet time associated with the host objects. In one embodiment, packet processor 131 adds pointers to the LRU list as the corresponding flows become inactive (e.g., when a TCP connection is closed, or a threshold period of inactivity is reached, etc.). In one embodiment, when a new host is detected and the host object space is depleted, packet processor 131 selects the least-recently used host object from the LRU list and overwrites the host object space with a new host object.

A.2. Flow Control Module

As discussed above, flow control module 132 enforces bandwidth utilization controls (and, in some embodiments, other policies) on data flows traversing access link 21. A bandwidth utilization control for a particular data flow can comprise an aggregate bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

A.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. For example, a network administrator may configure a partition for data flows associated with suspicious users to limit the effect of the network traffic associated with them on utilization of access link 21.

A.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.3. Traffic Classification

A traffic class comprises a set of matching rules or attributes allowing for logical grouping of data flows that share the same characteristic or set of characteristics—e.g., a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. As discussed below, administrator interface 150 also allows for the selection and arrangement of traffic classes into hierarchical trees (see, e.g., FIG. 4A).

Traffic classification database 137 stores traffic classes associated with data flows that traverse access link 21. Traffic classification database 137, in one embodiment, stores the traffic classes and corresponding data (e.g., matching rules, policies, and partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree, such as the hierarchical directory-file structure depicted in FIGS. 4A and 4B. Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type.

A.3.a. Traffic Type Identification and Automatic Traffic Classification

In one embodiment, a traffic discovery engine (not shown) is operative to apply predefined sets of matching criteria to identify a traffic type associated with data flows traversing bandwidth management device 30. In one embodiment, the traffic discovery engine creates traffic classes automatically in response to data flows traversing bandwidth management device 30 and stores such traffic classes in traffic classification database 137. Automatic traffic classification is disclosed in U.S. Pat. No. 6,412,000, which is incorporated herein by reference. In one embodiment, the traffic discovery engine must detect a minimum number of data flows within a predefined period for a given traffic type before it creates a traffic class in traffic classification database 137. In one embodiment, such discovered traffic classes are, by default, attached to or associated with either a "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined or default bandwidth utilization controls. U.S. patent application Ser. No. 09/198,051, incorporated by reference herein, discloses automatic assignment of bandwidth utilization controls for discovered traffic classes.

The traffic discovery engine, in one embodiment, is supported by one to a plurality of traffic identification tables in a relational database that allow for identification of a traffic type (e.g., application, service, protocol, etc.) based on the attributes of a particular data flow. In one embodiment, the traffic discovery engine includes a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new data flow, the traffic discovery engine analyzes the control block object associated with the data flow against the service attributes in the services table to identify a service ID corresponding to the flow. In one embodiment, the traffic discovery engine may identify more than one service ID associated with the flow. In this instance, the traffic discovery engine associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, the traffic discovery engine associates the flow with the most specific service ID.

As discussed above, if the traffic discovery engine identifies a threshold number of flows for a given service type for which no traffic class has been configured, it will create a traffic class corresponding to the service type in traffic classification database 137. In one embodiment, the traffic discovery engine constructs a set of matching rules based on the corresponding service attributes in the services table (and/or other tables associated with the service ID) and stores them in association with a traffic class identification in traffic classification database 137. In one embodiment, the traffic discovery engine further stores the default bandwidth management policy associated with the service ID in traffic classification database 137.

II. Operation

A. Enforcement of Bandwidth Utilization Controls

FIG. 3 illustrates a method, according to one embodiment, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed. In one embodiment, packet processor 131 receives a data packet (FIG. 3, step 202) and determines whether the packet is part of a new data flow (step 204) or represents a change to an existing data flow (see steps 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the packet is a new data flow, packet processor 131 constructs a control block object including attributes characterizing the data flow (step 212) (see above). Otherwise, packet processor 131 determines whether flow database 135 contains an existing control block object corresponding to the data flow (step 208) (see Section A.1., supra). If so, packet processor 131 retrieves the control block object, updates various attributes (e.g., last packet time, etc.), and associates the packet with the control block object (step 218). If flow database 135 does not contain a control block object associated with the new data flow, packet processor 131 constructs a control block object as discussed herein (step 212). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow.

If the packet corresponds to an existing data flow, packet processor 131 retrieves the control block object and updates attributes of the control block object and/or flow specification object as appropriate (step 218). If elements of the data packet represent a change to the traffic type associated with the data flow (step 220), packet processor 131 passes the flow specification object to traffic classification engine 137 to identify a traffic class corresponding to the flow (step 214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the flow specification object (or a pointer to the flow specification object) to traffic classification engine 137. In one embodiment, the flow specification object or a copy of it is stored in association with the packet and in the same buffer structure to facilitate access to the flow specification object by traffic classification engine 137. As discussed in more detail below, traffic classification engine 137 operates on attributes of the control block object and/or flow specification object to identify traffic class(es) associated with the data flow (step 214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class (step 216) and enforces the bandwidth utilization controls on the data packet flow (step 222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (step 224) to allow for analysis of bandwidth utilization and other network statistics on a traffic class, access link, and/or partition level.

B. Monitoring and Detection of Suspicious User Activity and Scoring of Users

As discussed above, suspicion scoring module 138, concurrently with the bandwidth utilization control functionality described herein, monitors data flows traversing bandwidth management device 30 and operates to detect whether attributes of the data flows indicate suspicious activity or raise the likelihood that a user is engaging in or may engage in suspicious activity. In one embodiment, suspicion scoring module 138 does not run on the packet/data flow path, where it has real-time access to packet/flow data. In one embodiment, raw data associated with the data flows are recorded, suspicion scoring module 138 then operates on the recorded raw data in a different, lower-priority process than the packet processing and flow control processes described above. In one embodiment, a plug-in module runs on the packet/flow path and records the raw attributes of the data flows for subsequent processing by suspicion scoring module 138. A less time-constrained process, such as a Java or Python script or a plug-in, can examine the data sets associated with individual users and evaluate the suspiciousness of the user's activity.

Bandwidth management device 30, in one embodiment, features a plug-in architecture that facilitates, among other things, updates to the suspicion scoring module 138 (as well as other) functionality. A plug-in can contain data that extends and/or modifies one or more tables or data structures used by suspicion scoring module 138 and/or updated code. Suspicion scoring module 138, in one embodiment, uses a shared (dynamic link) library loader to add suspicion scoring plug-ins to an existing software release during a boot sequence. The shared library loader, in one embodiment, is operative to determine whether any plug-ins exist (e.g., by checking a directory or other reserved file space), and to extend/modify traffic tables or other data structures and/or register specific code as required.

In another embodiment, bandwidth management device 30 can be configured to include an embedded runtime environment (not shown) that is operative to execute suspicion scoring scripts installed on bandwidth management device 30. Such an embodiment allows network administrators and others to create custom suspicion scoring scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled suspicion scoring scripts. In one such embodiment, the embedded runtime environment may include just-in-time compiler functionality to compile source code scripts into object or byte code form before execution. As discussed more fully below, bandwidth management device 30 stores one or more suspicion scoring scripts operative to yield a score or other indication of the suspiciousness of a user's activity. In one embodiment, scoring scripts are implemented as suspicion scoring objects, which are instantiations of suspicion scoring classes. In one embodiment, suspicion scoring objects can be instantiated for each user wherein the state of the suspicion scoring object can be pickled after execution, or after a threshold period of inactivity, to allow for suspicion scores to persist. U.S. application Ser. No. 10/178,617, incorporated by reference herein, discloses the incorporation of embedded runtime environments into bandwidth management devices and the pickling of objects to persist data and scores.

B.1. Suspicious Activity Traffic Class

In one embodiment, bandwidth management device 30, in addition to a SuspiciousUsers traffic class, includes a SuspiciousActivity traffic class that includes one or more matching attributes defining certain suspicious activity without regard to the identity of users. As discussed above, suspicious activity includes attempts to evade detection by bandwidth management devices and other network device that classify data flows, such as firewalls, etc. For example, computer networks include a variety of protocols and functionality necessary to, or facilitating, the operation of the networks. Such network traffic, such as email, DNS lookups, and other protocols have registered or reserved ports to which corresponding data flows are written. Certain unruly and bandwidth-intensive applications (and/or applications administratively blocked or limited) often run on ports registered with other protocols in an attempt to evade detection and pass through firewalls or bandwidth management devices. For example, peer-to-peer applications are often configured to operate on the port registered for Domain Name System (DNS) traffic. However, true DNS traffic, like traffic associated with other fundamental network protocols, features a specific format, to which the peer-to-peer application traffic does not adhere. In one embodiment, bandwidth management device 30 can be configured to verify that traffic written to a particular port is actually formatted according to the protocol(s) associated with that port. For example, matching attributes/rules can be configured to verify that traffic written to the registered DNS port is actually DNS traffic. In one embodiment, any traffic associated with the registered DNS port, but not in the proper format, is deemed suspicious traffic and classified in the SuspiciousActivity traffic class. In one embodiment, a network administrator can assign a restrictive bandwidth utilization policy, such as a small partition or a low priority policy. In one embodiment, bandwidth management device 30 can be configured to apply incremental bandwidth utilization controls to network traffic classified in the SuspiciousActivity traffic class. U.S. application Ser. No. 09/885, 750 discloses the application of incremental bandwidth restrictions to control aggressive, rogue network applications. Lastly, by extension, other matching attributes and rules can be configured for other protocol types, such as SMTP, SNMP and the like, to determine whether the network traffic is formatted according to the protocol(s) associated with the ports to which the traffic is written. In addition, the same detected activity can also be used to adjust the suspicion level of the user(s)/host(s) associated with the data flows, as discussed herein.

B.2. Identification of Users and Maintaining Suspicion Scores

According to one embodiment of the invention, users are identified by the IP address corresponding to the network access device (e.g., client device 42) associated with the user. Beyond IP addresses, users may be identified by any other suitable means, including MAC address, RADIUS, Kerberos, ActiveDirectory, DHCP, etc. In addition, bandwidth management device 30, in one embodiment, only maintains user activity or score data for "inside" users. In other embodiments, the suspiciousness of "outside" users is also monitored in addition to, or in lieu of, inside users. For example, bandwidth management device 30 may be configured to monitor data flows for suspicious activity related to DoS attacks initiated by outside hosts. As discussed above, packet processor 131 generates a flow specification object in response to a new data flow, including the inside and outside addresses associated with the data flow. Suspicion scoring module 138, in one embodiment, operates on attributes (e.g., ports, protocols, metrics, etc.) associated with the data flows in relation to "inside" and/or "outside" IP addresses and, in one embodiment, generates a suspicion level or score based on at least one attribute of the data flows. As discussed above, suspicion scoring module 138 can be configured to execute in the packet processing path, or on recorded data flow attributes in a separate lower-priority process. As discussed above, such scores or other indication of a suspicion level can be maintained as a "suspicion level or score" field in host database 134. In another embodiment, suspicion levels can be maintained in suspicion scoring objects as discussed above.

The suspicion levels can be maintained in a variety of ways to achieve different objectives. As discussed above, host database 134 can be extended to maintain at least one suspicion score field for each IP address. However, since the host database 134 is not persistent, such suspicion levels do not persist assuming either a period of inactivity (relative to a user) or re-initialization of bandwidth management device 30 (e.g., power cycle, etc.). While such a configuration is desirable and contemplated by the present invention, in one embodiment, bandwidth management device 30 stores the host database 134 in a persistent memory, such as a hard disk drive or other non-volatile media to allow suspicion levels to persist. In other embodiments, users and their associated suspicion scores are maintained as traffic classes in traffic classification database 137 also allowing the users' and their respective suspicion levels to persist. For example and in one embodiment, when a suspicion level or score crosses a threshold value, suspicion scoring module 138 adds the user as a child traffic class of a "SuspiciousUsers" traffic class.

In embodiments where suspicious users are represented as child traffic classes of a parent SuspiciousUsers traffic class, measurement engine 140 can be configured to store the suspicion level or score corresponding to a user traffic class. In such an embodiment, a User Event can be configured to monitor the suspicion level associated with the user traffic class, and when a threshold is crossed, emit an SNMP trap. In one embodiment, a User Event is defined as an arithmetic inequality: <ME-var> <relational op> <threshold>, where <relational op>='<', '<=', '>', or '>='. A User Event can be attached to a single traffic class, and can be configured to send an SNMP trap and/or email message when the threshold is crossed. This SNMP trap can be sent to a central network management server or station, such as Hewlett Packard's OpenView management platform, for reporting and management purposes. In another embodiment, the central network management station can host a network management application operative to receive measurement and other data from network devices, such as PolicyCenter™ (offered by Packeteer, Inc. of Cupertino, Calif.) which is operative to extract measurement data from a plurality of PacketShaper® bandwidth management devices. In one embodiment, the network management application, in response to an SNMP trap transmitted by a first bandwidth management device, can be configured to change the configuration of other bandwidth management devices to, for example, add the suspicious user traffic class to the traffic classification configurations of the other bandwidth management devices.

As discussed above, bandwidth management device 30 can maintain suspicion levels and local variables factoring into the suspicion levels in suspicion scoring objects instantiated on a per-user basis in an embedded runtime environment. Such suspicion scoring objects can also be configured to write the resulting suspicion scores in corresponding fields in host database 134. In one embodiment, suspicion scoring module 138 includes functionality that manages suspicion scoring objects in an embedded runtime environment, including instantiation of new objects in response to new users, pickling of objects in response to a threshold period of inactivity, and un-pickling of suspicion scoring objects when data flows associated with existing users are encountered. In one embodiment, the suspicion scoring object management functionality can be written itself as a object management class in or as a native code module making calls into the embedded runtime environment.

FIG. 5 illustrates a method associated with management of suspicion scoring objects according to one embodiment of the present invention. As FIG. 5 illustrates, suspicion scoring module 138 monitors for new data flows (see step 302). When a packet is received and a new data flow is detected, suspicion scoring module 138 determines whether the inside and/or outside user associated with the data flow is a new user (step 304). In one embodiment, a new user is a user for which no suspicion scoring object exists. If the user associated with the flow is a new user, suspicion scoring module 138 instantiates a suspicion scoring object from the suspicion scoring class in the embedded runtime environment (step 310). Otherwise, if the suspicion scoring object corresponding to the user has been pickled (see step 306), suspicion scoring module 138 un-pickles the suspicion scoring object (step 312) and passes a pointer to the packet stored in the buffer (see above) to the suspicion scoring object (step 308). The suspicion scoring object then operates within the embedded runtime environment to generate a suspicion level or score, as discussed more fully below. In other embodiments, where the suspicion scoring objects are not executed in the packet processing and flow control paths, suspicion scoring objects can be un-pickled to operate on raw data stored during operation of bandwidth management device and pickled after execution during a different, non-real-time process. In one form of such an embodiment, new suspicion scoring objects can be instantiated upon the detection of a new user/host in the recorded raw data.

FIGS. 4A and 4B illustrate two traffic classification configurations according to different embodiments of the present invention. As discussed above, traffic classification database 137 is configured to apply the matching rules of each traffic class in the order in which they are configured. The "LocalHost" traffic class corresponds to data flows destined for bandwidth management device 30, such as requests for stored measurement data or device configuration changes. If a traffic class is found, the traffic classification database 137 stops the instant search process and returns the identified traffic classification. Accordingly, by placing the "SuspiciousUsers" traffic class before other traffic classes, data flows associated with suspicious users can be classified in the "SuspiciousUsers" traffic class to allow for application of appropriate bandwidth utilization controls. FIG. 4A illustrates a traffic classification configuration including a "SuspiciousUsers" traffic class. In one embodiment, the suspicious users traffic class can include at least one matching rule/attribute based on the suspicion level (e.g., a score) that operates to classify data flows associated with the user in that traffic class. For example, the SuspiciousUsers traffic class can be configured to include a threshold suspicion level or score below (or above) which causes the data flows associated with the user to be classified in the SuspiciousUsers traffic class. Accordingly, traffic classification database 137 can be configured to operate on the "suspicion score" field associated with the "inside" and/or "outside" IP address in host database 134. In another embodiment, when a suspicion level crosses a threshold, the IP address (or other attribute identifying the user) of the corresponding user is added as a matching attribute to the "SuspiciousUsers" traffic class. In one embodiment, suspicion scoring module 138 is operative to modify the configuration of traffic classification database 137 when such a threshold has been reached. In one embodiment, users not classified as "suspicious" are not grouped into a traffic class to allow for application of bandwidth utilization controls for regular network traffic. In addition, FIG. 4A shows the SuspiciousUsers traffic class as a leaf node in the traffic classification configuration hierarchy. However, in other embodiments, the traffic classification scheme can be configured such that the SuspiciousUsers traffic class includes one or more child traffic classes (e.g., HTTP, FTP, etc.) to allow for controlling bandwidth utilization for suspicious users on an application-level or other, more granular basis, as well. In one embodiment, the SuspiciousUsers traffic class can be configured to include a copy of the traffic classification configuration scheme associated with regular network traffic. FIG. 4B illustrates the traffic classification scheme according to an alternative embodiment wherein users are added as child traffic classes to the "SuspiciousUsers" traffic class. In addition, although the examples provided in FIGS. 4A and 4B illustrate a solitary "SuspiciousUsers" traffic class, other embodiments of the present invention may be configured to include a plurality of traffic classes oriented around multiple levels of suspicion. For example, bandwidth management device 30 can be configured to include a "QuarantinedUsers" traffic class, as well as a SuspiciousUsers traffic class. According to one embodiment of this configuration, QuarantinedUsers is a traffic class for data flows associated with users having a certain suspicion score range, while the SuspiciousUsers traffic class corresponds to data flows associated with users having a lower suspicion score rating. According to such an embodiment, different bandwidth utilization controls can be configured for different users based on the suspicious nature (or not) of their activities. For example, in one embodiment, bandwidth management controls are configured to block or degrade network access provided to "quarantined" users. A variety of configurations are possible. For example, a discard policy may be associated with the QuarantinedUsers traffic class to deny network access to users whose suspicion scores exceed a predetermined threshold.

In addition, the traffic classification scheme may also be configured to apply different or more rigorous traffic classification to data flows associated with suspicious users in order to determine the characteristics of the network traffic for use in determining the correct traffic class. For example, the child traffic classes of the parent SuspiciousUsers traffic class may contain additional matching rules to allow for a more rigorous network traffic classification scheme. For example, the HTTP traffic class may be configured to include one or more child traffic classes, such as PeerToPeer, etc. to allow for disparate treatment, within the SuspiciousUsers traffic class between normal HTTP flows and flows associated with HTTP tunnels. In addition, the matching rules may be configured to based on the observed fingerprints of suspicious activity, as discussed more fully below. In this manner, bandwidth management device 30 can be configured to more closely scrutinize data flows associated with suspicious users to attempt to more accurately characterize the network traffic associated with them, while devoting less scrutiny (and processing power) to regular users.

B.2.a. Exceptions and Heightened Scrutiny Lists

In one embodiment, suspicion scoring module 138 maintains an exclude list and/or a "heightened scrutiny" list that determine whether or not data flows associated with a particular host or user are examined for suspicious activity. As one skilled in the art will recognize, the monitoring and recording of metrics associated with data flows can yield a vast amount of data. Furthermore, analysis of data flows for suspicious activity (e.g., is it to a proxy service?; does it have the signature of a peer-to-peer flow?; is it really an HTUP flow?; etc.) consumes precious CPU cycles otherwise available for the packet processing path. Accordingly, especially for larger networks including many hosts, analyzing data flows associated with every user may not scale in a manageable and effective manner. To address this concern, suspicion scoring module 138, in one embodiment, is configured to include an exclude list and/or a heightened scrutiny list determining whether or not data flows associated with users in such lists are analyzed. In one embodiment, such lists also determine whether raw data characterizing flows associated with individual users are collected to reduce the memory and processing requirements associated with collecting the raw data. For example, certain users or user groups (identified, for example, by subnets or IP addresses may be declared "above suspicion" and placed on an exclude list. In a university setting, for instance, faculty and staff IP addresses can be placed on an "above suspicion" or exclude list. In addition, network administrators may place themselves on such a list as well. Accordingly, suspicion scoring module 138, in one embodiment, excludes data flows associated with users on the exclude list from its raw data collection and/or suspicion analysis processes.

In another embodiment, users may be added to a "heightened scrutiny" list used by scoring module 138 to determine the users for which data flows associated with such users are monitored for suspicious activity. For example, certain addresses or address ranges might be declared as requiring "heightened scrutiny." A network administrator in a university setting, for instance, may add the subnet(s) corresponding to the undergraduate dorms to a "heightened scrutiny" list. In another embodiment, the heightened scrutiny list can contain users previously classified as "suspicious users." In one embodiment, users or user groups can be added to the "heightened scrutiny" list for a period of time to monitor for suspicious activity and determine which users may be suspicious. After a sufficient analysis interval, the previous user group is removed and another user group is added to the "heightened scrutiny" list. In this manner, bandwidth management device 30 can be configured to monitor a subset of users associated with a computer network environment and rotate among these subsets in a round robin fashion to eventually monitor, for respective analysis intervals, all users associated with a computer network environment. As one skilled in the art will recognize the exclude and heightened scrutiny lists can be implemented in a variety of ways. For example, the lists may be text delimited ASCII files include the computer network addresses or subnets (or other user identification).

B.3. Detection of Suspicious Activity

Suspicious activity, in one embodiment, is activity engaged in by users for the purpose of evading the network traffic classification and control functionality associated with bandwidth management device 30. Suspicious activity may also be other potentially disruptive or unruly activity (or activity suggesting that such activity is likely or imminent), such as activity suggesting that a user is using a port-scanning application or launching, or preparing to launch, a Denial-of-Service (DoS) attack. Suspicious activity may take a variety of forms and will evolve as the configuration and functionality of bandwidth management devices change in response to new evasion methods and techniques, or other forms of suspicious activity. The following provides an exemplary set of suspicious activities that may be used in embodiments of the present invention. Detection of such suspicious activities can be used as factors in computing a suspicion level or score, as discussed more fully below.

In one embodiment, the following factors, either alone or in combination, can be used to detect or evaluate potentially suspicious activity. In one embodiment, while the content of data flows may be obscured by an encrypted tunnel mechanism, the fingerprints of various forms of suspicious activity, gleaned from observation of current network environments, can be used to develop scripts and other processes for evaluating data flows to detect suspicious activities. Such fingerprints can be expressed relative to one or more metrics or other attributes associated with the data flows. Table 7 illustrates the data flow metrics maintained in host database 134, according to an embodiment of the present invention. As discussed above, in one embodiment, a process executing in the packet processing path, for example, can collect the raw data at periodic intervals for subsequent evaluation in a separate lower-priority process. As Table 7 illustrates, packet processor 131, in one embodiment, maintains, inter alia, for each IP address 1) the number of concurrent connections (Conn); 2) the current data flow rate (Cur rate); and 3) the average bits per second (bps) over a one minute interval (1 Min avg). As Table 7 shows, packet processor 131 also maintains the number of new flows per minute placed to and from the host system both as a client and a server, as well as the number of failed connections per minute. Specifically, New Flows Per Minute-Server indicates how many connections have been initiated where the host is a server. Similarly, New Flows Per Minute-Client indicates how many connections the host initiates. In addition, the metrics in combination with a knowledgebase gleaned from examination of the behavioral traits or characteristics of various forms of suspicious activity can be used to develop functionality to evaluate data flows for the fingerprints of suspiciousness. For example, a large number of concurrent connections is characteristic of a supernode in a peer-to-peer network application. For example, a Kazaa supernode is a host system to which other peer hosts upload lists of available files and, therefore, receives search requests for available files as well. Accordingly, a large number of concurrent connections may indicate that the particular host is a supernode in a peer-to-peer application network. In addition, the amount of network traffic associated with a particular host (current average bits per second), either alone or in combination with other metrics (e.g., the number of concurrent connections) can also be used to compute a suspicion level. In addition, the number of connections to a host in a given time interval ("New Flows Per Minute-Server") may also be useful in determining suspicious activity. For example, a peer-to-peer application supernode to which many peers connect will have a high count and can be deemed suspicious. In addition, a large number of failed TCP connections ("New Flows Per Minute-Failed") may be indicative of port scanning. The metrics discussed above, as well as other metrics, can be used in computing suspicion levels. In one embodiment, the suspicion levels can be computed from raw data collected over an analysis interval, such as a 15-minute or any other suitable time period, and evaluated relative to threshold values.

B.3.a. Connecting to a Suspicious Resource

As discussed above, users in campus or university settings, for example, tunnel peer-to-peer application traffic in HTTP flows in an attempt to evade detection of the true nature of the data flow and the bandwidth utilization controls that would otherwise apply. To establish these tunnels, users typically access a commercial proxy tunnel resource to establish the tunnel. In one embodiment, suspicion scoring module 138 is configured to detect connections to suspicious resources, such as proxy tunnel resources. Detection of suspicious resources can be based on the Uniform Resource Locators (URLs) (or portions of URLs, such as domain names, etc.) or IP addresses corresponding to the suspicious resources. Detection can also be based on large inbound file transfers from a suspicious resource, which may indicate the download of tunnel client software.

In one embodiment, suspicion scoring module 138 is also configured to detect connections to network resources that implies or raises the likelihood that other data flows associated with the user may be suspicious. For example, if bandwidth management device 30 may be configured to detect a connection to a peer-to-peer application resource.

In addition, bandwidth management device 30 can be configured to associate data flows between two particular hosts and treat them as suspicious flows, based on the detected attributes of prior data flows between two hosts. For example, if bandwidth management device 30 detects the initiation of a tunnel connection between an inside host and a known or subsequently detected proxy tunnel server, it can treat all subsequent flows between the two host systems as suspicious data flows. As discussed above, bandwidth management device 30 can classify the data flows as suspicious network traffic and apply corresponding bandwidth utilization controls to the data flows, and/or apply increased scrutiny to the data flows.

B.3.b. Traffic Pattern Analysis

In addition, analysis of network traffic patterns may be employed to detect suspicious activity. For example, suspicion scoring module 138 can be configured to analyze the network traffic associated with users against a traffic pattern template. For example, normal HTTP traffic typically involves a small outbound request or group of requests followed by larger responses. In addition, the intervals between such HTTP requests are generally uneven or non-uniform. In one embodiment, suspicion scoring module 138 is configured to analyze the HTTP traffic patterns to detect suspicious activity against a regular HTTP traffic flow template. For example, suspicion scoring module 138 may be configured to detect large HTTP requests transmitted from an "inside" client device indicative of peer-to-peer application file sharing. Other possible patterns include a single HTTP request followed by multiple responses, and/or even or uniform time intervals between responses.

B.4. Computing Suspicion Levels

As discussed above, suspicion scoring module 138, in one embodiment, analyzes attributes of data flows traversing bandwidth management device 30 in relation to inside/outside users and, in one embodiment, computes a score indicating the level of suspicion associated with the user's activity. The suspicion score may take a variety of forms. For example, the suspicion score may be a numerical value within a predetermined range (e.g., 0 to 100, where 0 indicates not suspicious, or vice versa), or a alphanumeric rating (e.g., A, B, C, etc.), or even more binary Normal or Suspicious rating. As discussed above, when a user's suspicion score crosses a threshold value the data flows associated with the user are classified in the SuspiciousUsers traffic class. For example, each individual user may start out with a score of 100. Each time a suspicious or questionable activity is detected (e.g., set up of a connection to an outside HTTP tunnel, or set up of a Kazaa-cmd (or other peer-to-peer application) flow), suspicion scoring module 138 can adjust the suspicion score by, for example, 10 points. Data flows corresponding to users with a sufficiently high suspicion level can have different classification rules and/or policies associated with them (for example, bandwidth management device 30 can be configured to consider all of their HTTP traffic suspicious and lower its priority, or the classification matching rules may be configured such that it is more likely to consider some traffic to be peer to peer traffic, than we would be the case for regular users). Of course, a variety of scoring protocols and configurations can be used. For example, suspicion scoring module 138 can be configured such that suspicion scores decay over time, assuming no other suspicious activities are detected in connection with the user.

The following is a suspicion scoring script that operates in an environment wherein a separate module or process monitors the data flows, generates one or more suspicion scores for at least one user/host and stores the scores in host database 134. In one embodiment, a suspicion level associated with a user can be characterized as a composite suspicion level including on one or more suspicion scores. For example, a suspicion level may comprise a "tunnel" score indicating the likelihood that the user is tunneling data flows to evade detection, and a "misfit" score characterizing how closely the fingerprints of data flows (e.g., HTTP flows) match expected traffic patterns. A user may be placed in the suspicious users classification in response to a threshold crossing event associated with one or both of the scores in the composite. The script provided below, when invoked, retrieves scores from the host database 134, and adjusts the configuration of the traffic classification database 137 to add/remove users from the suspicious users traffic class in response to the data retrieved from host database. As the code set forth below illustrates, in one embodiment, the script may also operate to decay suspicion scores. In one embodiment, the script can be run on a periodic basis, such as every 15 minutes or any other suitable interval. The script, in one embodiment, can essentially operate on and maintain a list of suspicious users or, in the alternative, can operate to directly adjust the traffic classification database.

```
import Suspicion
class     SuspiciousScoringExample(Suspicion.Suspi-
cionScore):
  def _init_(self, thresholds, listName, decayRate):
    """'thresholds' is a dictionary of named values kept by
       the Host Database, and the associated thresholds to
       be applied.
    'listName' is the list that this module is maintaining.
    'decayRate' is the number of periods of inactivity before
       a host is removed from the list.
    """
    Suspicion.SuspicionScore._init (self, 'Example1')
    self.thresholds = thresholds
    self.listName = listName
    self.decayrate = decayRate
  def evaluate(self):
    """In this example, the HostDB is first queried for the hosts
       beyond each of our thresholds.
    Secondly, the previous list is 'aged' according to the
       'decayRate' configured into this module.
    """
    newMembers = { }
    for scoreName in self.thresholds.keys( ):
      newMembers.update(Suspicion.hostDBQuery(score-
        Name, self.thresholds[scoreName]))
    # note that 'hosts' is now the OR of all the query results.
    # next, take any host in existing list NOT in the new list,
        and
    # decide whether to age it out or not.
    oldMembers = Suspicion.getList(self.listName)
    for oldHost in oldMembers:
      if not newMembers.has_key(oldHost): # not in new
          list; may be aged out now
        if not oldMembers[oldHost]:
          newMembers[oldHost] = {'inactive':1}
        else:
          oldMembers[oldHost] ['inactive'] += 1
          if oldMembers[oldHost] ['inactive'] < self.de-
            cayRate:
            newMembers[oldHost] = oldMembers [old-
              Host]
``` else: # it's in the new list AND in the old
    newMembers[oldHost] = oldMembers[oldHost]
Suspicion.setList(self.listName, newMembers)

In this example, written in the embedded object environment Python, a script is configured with a set of named "scores" maintained by the host database 134, and the thresholds on those scores it is to enforce. The script is assumed to have available to it a set of services, namely:

1) def setList(listname, members) takes a Python "dictionary" of the new members of the named list. (In one embodiment, this dictionary would then have its members extracted by another module, and used to configure a traffic class, e.g. "SuspiciousUsers");

2) def getList(listname) returns a "dictionary" of the current members of the named list;

3) def hostDBQuery(scoreName, threshold) queries the host database 134 for a list of hosts whose named score "scoreName" exceeds a given threshold.

The example sets its list to the "OR" value of those hosts whose scores exceed the configured thresholds, and then "ages" them, so that a host which was previously on the list, but has not been for the "decayRate" number of periods, is dropped from the list.

B.5. Exemplary Bandwidth Utilization Control Configurations

As one skilled in the art will recognize, a variety of bandwidth utilization control configurations can be applied to the SuspiciousUsers traffic class. For example, a network administrator may configure a partition to cap the amount of bandwidth available to suspicious users. In another embodiment, a network administrator may associate a low priority policy to be applied on a per-flow basis. In addition, a network administrator may configure a progressive policy scheme to the SuspiciousUsers traffic class. U.S. application Ser. No. 10/177,518, incorporated by reference herein, discloses the implementation and use of progressive policy schemes in bandwidth management devices. In one embodiment, the crossing of a suspicion score threshold can be configured as an expiration condition causing a more restrictive bandwidth utilization control to be applied to data flows associated with a user. In addition, for aggressive peer-to-peer applications, bandwidth management device 30 may be configured to place gradually increasing bandwidth utilization restrictions on such flows. As discussed above, U.S. application Ser. No. 09/885,750 discloses the dynamic control of rogue network applications featuring the application of incremental bandwidth restrictions. In addition, as discussed above, bandwidth management device 30 may be configured to more closely scrutinize data flows associated with suspicious users, such as the application of more rigorous matching rules or other analysis, to better classify such data flows.

Lastly, although the present invention has been described as operating in connection with end systems and proxies employing the HTTP, TCP and IP protocols, the present invention has application in computer network environments employing any suitable session layer, transport layer and network layer protocols. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

The invention claimed is:

1. A method allowing for bandwidth management schemes responsive to utilization characteristics associated with individual users, the method comprising
    monitoring, at a network device, data flows relative to at least one user for indications of suspicious activity directed to evading classification of network traffic associated with the at least one user by a network traffic classification device;
    maintaining a suspicion level for the at least one user based on detected indications of suspicious activity, wherein the detected indications of suspicious activity comprise a user connecting to a tunnel proxy resource operative to encrypt data flows corresponding to the user; and
    applying bandwidth utilization controls to the data flows associated with the at least one user based on the respective suspicion level.

2. The method of claim 1 wherein at least one of the indications of suspicious activity comprises a user connecting to a tunnel proxy resource further comprising the step of conditionally applying a decay rate to the suspicion level, wherein the decay rate results in the lowering of the suspicion level for the user if no detected indications of suspicious activity occur during a pre-defined number of periods.

3. The method of claim 1 wherein at least one of the indications of suspicious activity comprises irregular data flow patterns.

4. The method of claim 1 wherein at least one of the indications of suspicious activity comprises a user connecting to a peer-to-peer application resource.

5. The method of claim 1 wherein at least one of the indications of suspicious activity comprises beyond a threshold number of connections to a host system.

6. The method of claim 5 wherein the host system is a server relative to the connections.

7. The method of claim 1 wherein the suspicion level is expressed as a suspicion score.

8. The method of claim 1 wherein the monitoring step comprises
    collecting raw data corresponding to data flows associated with the at least one user; and
    processing the collected raw data in a separate process to detect indications of suspicious activity.

9. An apparatus allowing for bandwidth management schemes responsive to utilization characteristics associated with individual users, comprising
    a suspicion scoring module operative to:
        monitor data flows relative to at least one user for indications of suspicious activity directed to evading classification of network traffic associated with the at least one user by a network traffic classification device; and
        generate a suspicion level for the at least one user based on detected indications of suspicious activity, wherein the detected indications of suspicious activity comprise a user connecting to a tunnel proxy resource operative to encrypt data flows corresponding to the user; and
    a bandwidth utilization control module operative to apply bandwidth utilization controls to data flows associated with the at least one user based at least in part on the respective suspicion levels.

10. The apparatus of claim 9 wherein the bandwidth utilization control module comprises
    a packet processor, a traffic classification databases and a flow control module;

wherein the packet processor is operative to:
  construct control block objects including attributes characterizing data flows traversing the apparatus, and
  associate packets to control block objects;
wherein the traffic classification database is operative to:
  operate on control block object attributes to identify traffic classes associated with data flows traversing the apparatus, and
  associate bandwidth utilization controls to the data flows based on identified traffic classes; and
wherein the flow control module is operative to enforce bandwidth utilization controls on data flows associated with corresponding traffic classes.

11. The apparatus of claim 9 wherein the suspicion scoring module is operative to:
  execute in the packet processing path to collect raw data associated with data flows traversing the bandwidth utilization control module; and
  process the collected raw data in a separate process to generate suspicion levels for the at least one user.

12. The apparatus of claim 9 wherein the suspicion scoring module includes a heightened scrutiny list comprising at least one user identification; and wherein the suspicion scoring module is operative to monitor only the data flows associated with user identifications in the heightened scrutiny list.

13. The apparatus of claim 12 wherein the user identification is a computer network address.

14. The apparatus of claim 12 wherein the user identification is a range of computer network addresses.

15. The apparatus of claim 14 wherein the range is expressed as a computer network subnet.

16. The apparatus of claim 9 wherein the suspicion scoring module is operative to maintain an exclude list comprising at least one user identification; and wherein the suspicion scoring module is operative to exclude from monitoring data flows associated with the at least one user identification on the exclude list.

17. The apparatus of claim 16 wherein the user identification is a computer network address.

18. The apparatus of claim 16 wherein the user identification is a range of computer network addresses.

19. The apparatus of claim 18 wherein the range is expressed as a computer network subnet.

20. The apparatus of claim 12 wherein the user identification is a ticket issued by a network authentication mechanism.

21. The apparatus of claim 10 further comprising a host database storing computer network addresses associated with data flows traversing the apparatus, wherein the host database maintains suspicion levels generated by the suspicion scoring module in association with the computer network addresses.

22. The apparatus of claim 10 wherein the traffic classification database maintains a traffic class for suspicious users; and wherein the suspicion scoring module is operative to change the configuration of the traffic classification database to classify data lows associated with users having a suspicion level beyond a threshold level in the traffic class for suspicious users.

23. A method allowing for bandwidth management schemes responsive to utilization characteristics associated with individual users, the method comprising
  monitoring, at a network device, data flows relative to at least one user for indications of suspicious activity directed to evading classification of network traffic associated with the at least one user by a network traffic classification device;
  maintaining a suspicion level for the at least one user based on detected indications of suspicious activity, wherein the detected indications of suspicious activity comprise a user connecting to a tunnel proxy resource operative to encrypt data flows corresponding to the user; and
  applying a heightened level of scrutiny to data flows associated with users having a suspicion level beyond a threshold suspicion level.

24. A method allowing for bandwidth management schemes responsive to utilization characteristics associated with individual users, the method comprising
  monitoring, at a network device, data flows relative to at least one user for indications of suspicious activity directed to evading classification of network traffic associated with the at least one use, by a network traffic classification device, wherein the indications of suspicious activity comprise a user connecting to a tunnel proxy resource operative to encrypt data flows corresponding to the user; and
  maintaining a suspicion level for the at least one user based on detected indications of suspicious activity.

25. The method of claim 24 further comprising
  reporting the suspicion level for the at least one user.

26. The method of claim 25 wherein the reporting step comprises
  transmitting the suspicion level for the at least one user to a remote network device.

27. The method of claim 26 wherein the remote network device is a central management server.

28. The method of claim 24 further comprising
  modifying the configuration of at least one network device in response to the suspicion level for the at least one user.

29. The method of claim 1 wherein the monitoring step comprises
  analyzing network traffic associated with one or more users against one or more traffic pattern templates; and
wherein the maintaining step comprises
  adjusting the suspicion level for the one or more users based on analyzing step.

30. The method of claim 1 wherein the monitoring step comprises
  analyzing HTTP network traffic associated with one or more users against an HTTP traffic pattern template; and
wherein the maintaining step comprises
  adjusting the suspicion level for a given user based on the analyzing step.

31. The method of claim 30 wherein the HTTP traffic pattern template comprises at least one attribute characterizing an expected behavior of regular HTTP traffic, and at least one attribute characterizing a suspicious behavior involving HTTP traffic.

32. The apparatus of claim 9 wherein the suspicion scoring module is operative to
  analyze network traffic associated with one or more users against one or more traffic pattern templates; and
  adjust the suspicion level for the one or more users based on analyzing step.

33. The apparatus of claim 9 wherein the suspicion scoring module is operative to
- analyze HTTP network traffic associated with one or more users against an HTTP traffic pattern template; and
- adjust the suspicion level for a given user based on the analyzing step.

34. The apparatus of claim 33 wherein the HTTP traffic pattern template comprises at least one attribute characterizing an expected behavior of regular HTTP traffic, and at least one attribute characterizing a suspicious behavior involving HTTP traffic.

* * * * *